May 9, 1961 E. M. WORMSER 2,983,887

RADIATION SENSITIVE DEVICES

Filed Sept. 29, 1954

INVENTOR
Eric M. Wormser
BY
John C. Blair
ATTORNEY

United States Patent Office 2,983,887
Patented May 9, 1961

2,983,887

RADIATION SENSITIVE DEVICES

Eric M. Wormser, Stamford, Conn., assignor, by mesne assignments, to Barnes Engineering Company, a corporation of Delaware Filed Sept. 29, 1954, Ser. No. 459,017

11 Claims. (Cl. 338—18)

Figure 1:
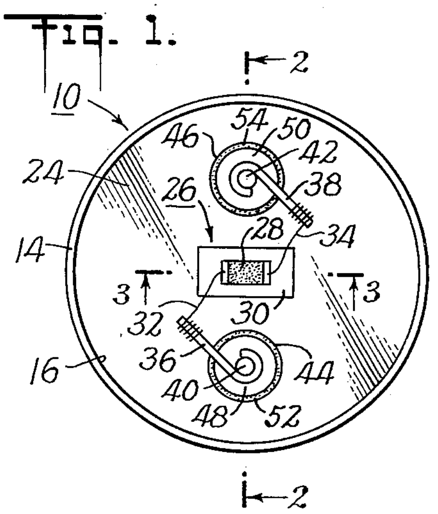

This invention relates to an improved construction for radiation sensitive devices. More specifically it relates to improvements in the construction of solid backed thermistor bolometers to obtain faster response rates than those previously obtainable.

Thermistor bolometers are useful for measuring infra-red radiation, and thus can be used for all types of temperature measurements. Prior to this invention the best thermistor bolometers consisted of a thin flake of resistance material with a high negative temperature coefficient cemented to a backing block of heat conducting material. In these solid backed thermistor bolometers the flake, about 10 microns in thickness, was coated with a black lacquer to make it more radiation absorbing. This flake and block assembly were mounted in a metallic housing, having a window transparent to infra-red radiation. Infra-red radiation impinging on the blackened flake through this window causes the flake to increase in temperature, thus changing its resistance. This resistance change is detected by applying a direct biasing voltage to the flake and measuring the change in current. Because the flake is thus electrically polarized it must be insulated from any electrical conductor. Accordingly, as will presently be described in detail, the backing block should have good electrical insulating properties because the adhesive layer between the flake and the backing block, is usually too thin to provide optimum insulating characteristics. The backing block also serves as a thermal conductor to transmit heat away from the flake and is thus termed a "thermal sink."

In most applications, thermistor bolometers should have a fast response rate to detect rapid changes in temperature or pulses of infra-red energy. This response rate is determined in part by the materials used for the backing block. Previously quartz has been used giving response rates characterized by time constants of 2 to 5 milliseconds and glass, which gives time constants in the range of 5 to 8 milliseconds. Materials having higher thermal conductivities such as anodized aluminum, or silver or copper with the required thin coating of insulating material did not give greatly improved response rates; the obstacle seemed to be that the combination of the cement layer and the amount of insulation required reduced thermal conductivity below that required for desirable response rates. Thus quartz became generally used as backing block when fast response was desired, with a consequent limitation of response rate time constants to the 2 to 5 millisecond range.

The backing block thermal conductivity also determines the steady state heat dissipation from the flake which in turn determines the maximum bias voltage which may be applied to the flake. Because the signal and the signal-to-noise ratio of these devices is directly proportional to such bias voltage, it is, of course, advantageous to have the highest thermal conductivity possible. As in the case of the response speeds, metallic backing blocks with thin insulating coatings did not produce the expected improvement in steady-state heat dissipation which their increase in thermal conductivity would imply. Thus the thermal conductivity of quartz or glass imposed an upper limit on the bias voltage, and thus the maximum signal and the signal-to-noise ratio as well as the response rate of the thermistor detector. Despite these shortcomings, solid backed thermistors formed from materials now in use are extremely desirable since they provide a detector which is extremely rugged and non-microphonic.

It is an object of this invention to provide devices sensitive to radiation preferably of the resistance type having this backing block construction with its attendant advantages but with improved thermal dissipation characteristics. Another object of this invention is to provide a device of the above character having faster response rates than those previously in use. A further object of this invention is to provide a device of the above character capable of operating with higher bias voltages to give improved signal-to-noise ratios. A further object of this invention is to provide a device of the above character through the use of improved materials for the backing block. Another object is to provide a device of the above character in which the resistance element has improved uniformity of response over its exposed area.

Other objects of the invention will be in part obvious and in part appear hereinafter.

The invention accordingly comprises the features of construction, combination of elements, and arrangement of parts which will be exemplified in the construction hereinafter set forth, and the scope of the invention will be indicated in the claims.

Figure 2:
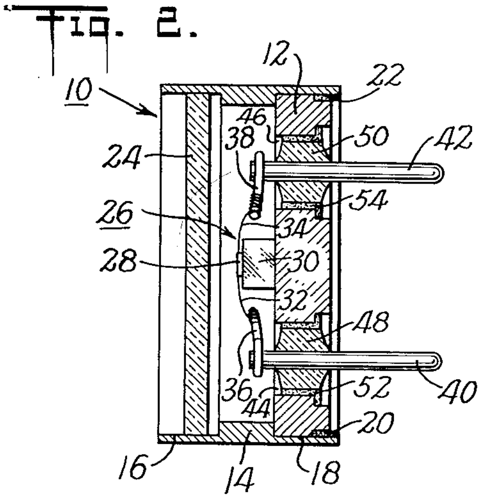
Figure 3:
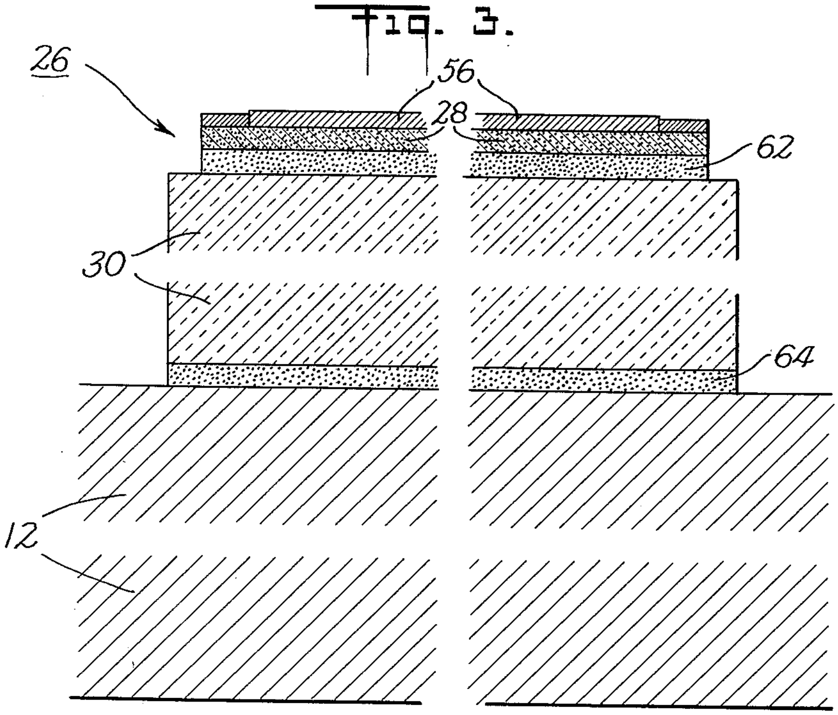

For a fuller understanding of the nature and objects of this invention, reference should be had to the following detailed description taken in connection with the accompanying drawing in which:

Figure 1 is a top elevation of my improved thermistor bolometer having the features of this invention incorporated therein, Figure 2 is a vertical sectional view of my thermistor taken along the line 2—2 of Figure 1 except for the lead details which are shown in elevation for purposes of greater clarity, Figure 3 is an enlarged sectional diagrammatic view of my thermistor and taken roughly along the line 3—3 of Figure 1, but eliminating certain parts shown therein.

Similar reference characters refer to similar parts throughout the several views of the drawing.

Generally speaking, I have discovered that the lack of flatness of the thermistor flakes used was primarily responsible for the unexpectedly poor performance previously obtained with backing blocks having generally a higher thermal conductivity than either glass or quartz. These flakes, in the process of manufacture are laid on flat plates of refractory material or metal plates coated with refractory material and sintered at temperatures of the order of 1000° C. Although the flakes are flat when entering the sintering furnace, the high temperatures which they encounter cause their edges to curl; also the flakes themselves warp during such sintering. For example, in a standard flake of 10 microns thickness this curvature would generally range between 15 and 200 microns measured from the plane of the lower surface of the flake to the lower surface of the curled edge. When a flake of such curvature was connected to the backing block with the thinnest possible layer at the central portion thereof the upward curl at the edges required a much thicker cement layer. If the flakes are placed on the block with the edges curled downwardly, the thickest cement layer will be at the central portion thereof. This resulted in cement layers whose average thickness was approximately 2 or 3 times the minimum thickness possible. When it is realized that the thermal conductivity of the cement layer is approximately 1/100 that of quartz per unit volume the importance of reducing the thickness of this layer can be better appreciated. For example, I have found that a cement layer of minimum average thickness (about 5 microns) has a thermal resistance equal to about one half that of the quartz backing block which is normally about 1 millimeter in thickness. Thus when curved flakes are cemented to backing blocks made of materials having a lower thermal resistance than quartz, the resulting cement layer being two or more times the minimum thickness, the thermal resistance of the cement layer is so high that the improved thermal characteristic of the backing material has no appreciable effect. In fact, for these improved materials, the thermal resistance of the average cement layer may be 10 or more times the backing block resistance.

A further disadvantage in using these non-flat flakes is that heat is not conducted uniformly away from the flake. Where the cement layer is very thin adjacent the central portion, heat is conducted away very rapidly, whereas at the edges of the flake, where the cement layer is much thicker, heat conduction is much slower.

Accordingly, to remedy these deficiencies in prior thermistor devices, I propose to use flakes which are flat to within 5 microns or less. These flakes are cemented to a ground and polished surface on the backing block with an adhesive layer of minimum thickness. Since 5 microns is of the order of magnitude of one wave-length in the infra-red spectrum, such flakes are "optically flat" to infra-red energy. Therefore flakes with curvatures of the order of 5 microns or less will hereinafter be referred to as "optically flat."

Flat flakes of this type can be obtained by processing the curled flakes obtained from the sintering furnace. A plurality of curled flakes are placed on a ground and polished optically flat high temperature glass plate. Another optically flat plate is placed above the flakes and is supported on the curled edges. The plates are placed in a furnace and the temperature is raised to above 1000° C. At this temperature a light pressure is applied to the plate for a few minutes and the furnace is then allowed to cool slowly. Most of the flakes, when removed from the furnace will be optically flat as described above and suitable for use with my invention.

Using these optically flat flakes it is possible to obtain cement layers of the order of 3 to 10 microns in average thickness and uniform to within 5 microns or less in thickness. With thin cement layers of this type conventional backing materials such as quartz or glass show some improvement in rate of response. More important however, materials with much higher thermal conductivities exhibit correspondingly faster rates of response.

One of the disadvantages normally incident to increasing the speed with which heat is carried away from the flake is a loss in responsivity. Because the temperature change of the flake is not as great, the resistance does not change as much; this would result in a lower signal output for the same biasing voltage. However, as previously mentioned, the permissible biasing voltage can be increased as the heat dissipating characteristics of the device improve. Thus, although the actual change in resistance decreases, the signal may be markedly increased because of the use of a higher bias voltage made possible by this greater heat dissipation. This usually results in some increase in signal-to-noise ratio with much faster response rates.

Referring to the drawings in detail and particularly to Figures 1 and 2 I have here shown a construction which may be used to house and support my improved thermally sensitive device, it being understood other structures could be utilized for this purpose. As shown herein a housing for a thermistor bolometer is generally indicated at 10, comprising a flat base 12, secured to a cylinder 14 to form a housing for the other parts of the device. Cylinder 14 has annular bores 16 and 18 adjacent its ends, base 12 resting in bore 18 and being held in place by solder seals or fillets 20 and 22. This base 12 is preferably copper, or a steel alloy which has the same coefficient of expansion as certain glasses and thus can be attached directly to it without resulting heat damage. A window 24 which is transparent to infra-red energy and hence preferably made from thallium bromide iodide, a synthetic optical crystal, or silver chloride, is cemented or otherwise secured to bore 16. Window 24, when made of silver chloride, is coated with silver sulphide which absorbs visible and ultraviolet radiation; if the window is made of thallium bromide iodide no coating is required. The coating protects the silver chloride from actinic action. Housing 14 is preferably formed from silver or some other noble metal to inhibit reaction with the window. A radiation sensitive apparatus, generally indicated at 26, to be more fully described hereinafter, is cemented or otherwise secured to base 12 and includes a thermally sensitive flake 28 and a backing block 30. The ends of flake 28 are preferably gold coated and leads 32 and 34 are connected thereto and to larger leads 36 and 38 which in turn are connected to pins 40 and 42 supported in holes 44 and 46 in the base 12 by glass seals 48 and 50. These seals are connected to the metal base by solder seals 52 and 54 and pins 40 and 42 are preferably shaped and located to plug into a standard tube socket or the like. Accordingly the device may be connected into a circuit so that a biasing voltage may be impressed across the flake 28 and signals from the flake amplified.

The structural details of the thermally sensitive apparatus 26 may be more readily comprehended from an examination of Figure 3 in which certain of the dimensions are greatly exaggerated for purposes of greater clarity. Thus the flake 28 of thermally sensitive resistance material is preferably coated with a black infra-red absorbent layer 56 such as a lacquer in which finely divided carbon black is suspended to enhance this important characteristic of the device. The flake is attached to backing block 30 by a cement layer 62 of minimum thickness. Backing block 30 is connected to base 12 by an adhesive layer 64. Thus flake 28 is supported in position to receive infra-red energy while being held to backing block 30 by a thin cement layer 62. Accordingly heat may be transmitted through layer 62 to the backing block acting as a heat sink and from there to the base 12 for further dissipation. The superior operating characteristics of my improved thermistor bolometer are not only due to the coaction of the individual parts thereof but also to the precise physical characteristics of such parts. The characteristics of particular significance will now be described in greater detail.

As previously noted flake 28 is a resistor having a high negative temperature coefficient and preferably comprises a mixture of the oxides of manganese, nickel and perhaps cobalt. The mixture of oxides is not conveniently expressed by weights since the state of oxidation of the metals is in question. It is preferably specified as the number of atoms of the particular metal present per 100 atoms of metal in the mixture. On this basis, the preferred resistance materials are 80 manganese–20 nickel, and 52 manganese–16 nickel–32 cobalt. Flakes produced of these materials have high negative coefficients of resistance and when infra-red energy impinges thereon the resultant increase in temperature decreases its resistance to change the current flow from the biasing source.

As has been previously mentioned, for purposes of this invention, the flakes 28 should be optically flat and not curled. For flakes to be "optically flat" in the sense of this invention and as said word is used in the claims hereof, they should be capable of passing between two plane parallel surfaces spaced apart a distance preferably no more than 5 microns greater than the flake thickness. Thus a flake 10 microns thick, to be termed "optically flat" should be capable of fitting between two plane parallel surfaces spaced 15 microns apart. Flakes with greater departures from such flatness are termed herein "non-flat" or "curled." These flakes are preferably generally rectangular in shape, of the order of 10 microns thick; typical flakes vary from 10 to 0.05 mm. in length and from 10 to 0.05 mm. in width.

Returning now to Figure 3 of the drawings as previously noted flake 28 is attached to the backing block by cement layer 62 of minimum thickness, i.e. the layer is as thin as possible while still performing its adhesive function. In practice I have found that the average thickness of this layer should not be greater than 10 microns and preferably should be about 5 microns; layers in such range of thickness are hereinafter termed "thin." It should also be as uniform as the variation in flake flatness will permit. Possibly the flake and the adjacent surface of the backing block could be made non-flat provided the space therebetween was uniform to within 10 microns to assure a thin cement layer and such structure is within the contemplation of this invention. Not only must the cement establish a strong bond between flake and backing block but it should offer minimum resistance to heat flow. The cement layer should be of insulating material in order not to short circuit the flake, but as has been mentioned, it is not desirable to depend upon the adhesive layer to insulate the flake from an electrically conducting block since the cement layer is very thin and small perforations may develop in it. Plastic resins are preferred as a general class of materials to be used for this cement because they provide the requisite strong but flexible bond over wide temperature ranges between the flake and the backing block. However, their thermal conductivity is of the order of $5 \times 10^{-4}$ calories/sec. ° C. cm.$^2$ per centimeter of length as compared with Z-cut quartz which has a thermal conductivity between 3 and $4 \times 10^{-2}$ calories/sec. ° C. cm. per centimeter of length. Thus a layer of cement about $\frac{1}{100}$ as thick as a quartz block of the same area offers about the same resistance to heat flow as the block. Accordingly thicker layers of cement as found in prior devices using non-flat flakes offered correspondingly higher resistances to heat flow. It was this high resistance to heat flow caused by a thick cement layer such as layer 62 that prevented backing materials of improved thermal conductivity from giving improved performance in these prior devices.

The general class of materials suitable for use as a backing block 30 have high thermal conductivity, preferably comparable to that of the metals, but low electrical conductivity, preferably comparable to that of materials used as electrical insulators. The ideal would be high thermal conductivity and excellent insulating characteristics, but some compromise must be made in a material combining such characteristics, for they are usually incompatible in the same substance. With the thin cement layers obtainable by use of flat flakes, the higher thermal conductivity characteristics of the backing block will make an appreciable difference in the overall efficiency of the thermistor device; greater response speeds than those previously obtainable with quartz or glass thus become possible.

I have found that beryllium oxide ceramic is one of the best materials for use as a backing block in my improved device; it is a good insulating material having a thermal conductivity of the order of 0.4 calorie/sec. ° C. cm.$^2$ per centimeter of length or, as previously mentioned, a conductivity of the order of 10 times that of Z-cut quartz and approaching that of aluminum. By use of such material I have produced thermistor bolometers with response rates characterized by time constants of the order of 0.5 to 1.0 millisecond. Other materials having better thermal conductivity than quartz and suitable for use as a backing block are magnesium oxide, with a thermal conductivity of 0.1 cal./sec. ° C. cm.$^2$ per centimeter of length and sapphire (crystalline $Al_2O_3$) having a somewhat lower conductivity. Magnesium oxide and sapphire produce thermistor bolometers with response rates characterized by time constants of the order of 1 to 3 milliseconds. Of course, with very thin cement layers, any insulating material having a high thermal conductivity will give increased response rates, since the limitation on the thermal conduction from the flake due to the cement has been removed to all intents and purposes. Hence this invention should not be limited to the specific materials therein mentioned.

Referring again to Figure 3, as previously noted, backing block 30 is cemented to the base 12 of the housing by adhesive layer 64, preferably of the same class of materials as the adhesive layer 62. This layer should be as thin as is consistent with its function of flexibly bonding these parts together; in practice it is usually of the order of 10 to 30 microns. While layer 64 should offer low thermal resistance such characteristic does not affect speed of response of the bolometer in the manner of layer 62, as mentioned above, since block 30 forming a thermal sink is interposed between this layer and flake 28. Heat is conducted through this layer to the housing base 12 and connected parts to be dissipated in the surrounding structure.

The essential features of my improved thermistor bolometer are the use of optically flat flakes with resulting thin cement layers, and the use of materials with higher thermal conductivity for backing blocks. The restriction heretofore imposed to improved response rates by thick cement layers is removed through the use of "optically flat" flakes. Thus higher thermal conductivities of the backing materials can be exploited to produce much faster response rates without loss of signal-to-noise ratio. It should be noted that while optically flat flakes with conventional backing block materials show some improvement in response rate, and that the improved materials with conventional flakes also show some improvement, the combination of the optically flat flake and the improved materials provide a major improvement in the operation of the thermistor bolometer.

While I have suggested certain materials given improved response rates in connection with the use of optically flat flakes of thermally sensitive resistance material, it is to be understood that other materials, not herein mentioned may also give such improved response rates, and therefore my invention is not to be limited to the particular materials herein described. Also, although I have described this invention as applied to thermal resistor devices such as thermistor flakes, certain phases of the invention may be useful with other types of solid backed heat sensitive devices, such possibilities being metal bolometers, resistance wire thermal detectors and semi-conductor thermal detectors of the condenser type.

Further, although I have shown only a single sensitive element in the housing of Figures 1 and 2, two or more units, one or more of which may be shielded, may be included in such housing, without departing from the scope of this invention.

It will thus be seen that I have provided an improved solid backed thermistor balometer and that the objects set forth above, among those made apparent from the preceding description, are efficiently attained. Since certain changes may be made in the above constructions without departing from the scope of the invention, it is intended that all matter contained in the above description, or shown in the accompanying drawing shall be interpreted as illustrative and not in a limiting sense.

It is also to be understood that the following claims are intended to cover all of the generic inventions herein described, and all statements of the invention, which, as a matter of language, might be said to fall therebetween.

Having described my invention, what I claim as new and desire to secure by Letters Patent is:

1. In a bolometer, the combination of an infrared transparent window, an optically flat thermistor flake capable of passing between two plane parallel surfaces spaced apart no more than five microns greater than the thickness of said flake, a backing block of material having high thermal conductivity and low electrical conductivity, and a thin thermally conductive adhesive layer not more than ten microns in thickness bonding said flake to said backing block.

2. In a bolometer, the combintion of an infrared transparent window, an optically flat thermistor flake capable of passing between two plane parallel surfaces spaced apart no more than five microns greater than the thickness of said flake, a backing block of material having high thermal conductivity and low electrical conductivity and having a ground and polished surface and a thin thermally conductive adhesive layer not more than ten microns in thickness bonding said flake to said surface of said backing block.

3. In a bolometer, the combination of an infrared transparent window, an optically flat thermistor flake capable of passing between two plane parallel surfaces spaced apart no more than five microns greater than the thickness of said flake, a backing block of material having high thermal conductivity and low electrical conductivity and having an optically flat surface, and a thin thermally conductive adhesive layer not more than ten microns in thickness bonding said flake to said surface of said backing block.

4. In a bolometer, the combination of an infrared transparent window, an optically flat thermistor flake capable of passing between two plane parallel surfaces spaced apart no more than five microns greater than the thickness of said flake, a backing block of material selected from the group of materials consisting of beryllium oxide, magnesium oxide and sapphire (crystalline $Al_2O_3$), and a thin thermally conductive adhesive layer not more than ten microns in thickness bonding said flake to said backing block.

5. In a bolometer, the combination of an infrared transparent window, an optically flat thermistor flake capable of passing between two plane parallel surfaces spaced apart no more than five microns greater than the thickness of said flake, a backing block of material having high thermal conductivity and low electrical conductivity, and a thin thermally conductive cement layer not more than ten microns in thickness of thermosetting resin bonding said flake to said backing block.

6. In a bolometer, the combination of an infrared transparent window, a thermistor flake capable of passing between two plane parallel surfaces spaced apart no more than five microns greater than the thickness of said flake, a backing block of material having high thermal conductivity and low electrical conductivity, and a thin thermally conductive adhesive layer bonding said flake to said backing block, the difference between the maximum and minimum distances between said flake and said backing block being no greater than 5 microns.

7. In a bolometer, the combination of an infrared transparent window, a thermistor flake capable of passing between two plane parallel surfaces spaced apart no more than five microns greater than the thickness of said flake, a backing block of material having high thermal conductivity and low electrical conductivity and having a ground and polished surface and a thin thermally conductive adhesive layer bonding said flake to said surface of said backing block, the difference between the maximum and minimum distances between said flake and said backing block being no greater than 5 microns.

8. In a bolometer, the combination of an infrared transparent window, an optically flat thermistor flake capable of passing between two plane parallel surfaces spaced apart no more than five microns greater than the thickness of said flake, a backing block of material having high thermal conductivity and low electrical conductivity, and a thin thermally conductive adhesive layer bonding said flake to said backing block, the difference between the maximum and minimum distance between said flake and said backing block being no greater than 5 microns.

9. In a bolometer, the combination of an infrared transparent window, an optically flat thermistor flake capable of passing between two plane parallel surfaces spaced apart no more than five microns greater than the thickness of said flake, a backing block of material having high thermal conductivity and low electrical conductivity and having an optically flat surface, and a thin thermally conductive adhesive layer bonding said flake to said surface of said backing block, the difference between the maximum and minimum distances between said flake and said backing block being no greater than 5 microns.

10. In a bolometer, the combination of an infrared transparent window, a thermistor flake capable of passing between two plane parallel surfaces spaced apart no more than five microns greater than the thickness of said flake, a backing block of material selected from the group of materials consisting of beryllium oxide, magnesium oxide and sapphire (crystalline $Al_2O_3$), and a thin thermally conductive adhesive layer bonding said flake to said backing block, the difference between the maximum and minimum distances between said flake and said backing block being no greater than 5 microns.

11. In a bolometer, the combination of an infrared transparent window, a thermistor flake capable of passing between two plane parallel surfaces spaced apart no more than five microns greater than the thickness of said flake, a backing block of material having high thermal conductivity and low electrical conductivity, and a thin thermally conductive cement layer of thermosetting resin bonding said flake to said backing block, the difference between the maximum and minimum distances between said flake and said backing block being no greater than 5 microns.

References Cited in the file of this patent

UNITED STATES PATENTS

| | | |
|---|---|---|
| 919,078 | Ribbe | Apr. 20, 1909 |
| 2,414,792 | Becker | Jan. 28, 1947 |
| 2,414,793 | Becker | Jan. 28, 1947 |
| 2,491,320 | Koontz | Dec. 13, 1949 |
| 2,788,452 | Sternglass | Apr. 9, 1957 |

FOREIGN PATENTS

| | | |
|---|---|---|
| 460,016 | Canada | Sept. 27, 1949 |

OTHER REFERENCES

OSRD 5991, Final Report on Development and Operating Characteristics of Thermistor Bolometers, by J. A. Becker et al., Oct. 31, 1945, declassified May 6–10, 1946, pages 10 through 14 are relied on.

Journal of the Optical Society of America, vol. 43, No. 1, January 1953, pp. 15–21.

Electrical Engineering: Transactions section, November 1946, pages 711–721.